(12) United States Patent
Pas

(10) Patent No.: US 6,196,160 B1
(45) Date of Patent: Mar. 6, 2001

(54) EGG INCUBATING TRAY

(75) Inventor: Henricus G. H. M. Pas, Clutadella (ES)

(73) Assignee: Jamesway Incubator Company, Ltd., Cambridge (CA)

( * ) Notice: Subject to any disclaimer, the term of this patent is extended or adjusted under 35 U.S.C. 154(b) by 0 days.

(21) Appl. No.: 09/051,882

(22) PCT Filed: Oct. 17, 1996

(86) PCT No.: PCT/NL96/00405

§ 371 Date: Aug. 10, 1998

§ 102(e) Date: Aug. 10, 1998

(87) PCT Pub. No.: WO97/14300

PCT Pub. Date: Apr. 24, 1997

(30) Foreign Application Priority Data

Oct. 20, 1995 (NL) ................................................. 1001466

(51) Int. Cl.[7] .................................................... A01K 31/16
(52) U.S. Cl. ............................................................ 119/322
(58) Field of Search ................................... 119/322, 323, 119/324, 325, 326, 327; 356/61

(56) References Cited

U.S. PATENT DOCUMENTS

| 1,533,499 | * | 4/1925 | Holbrook | 119/322 |
| 1,796,872 | * | 3/1931 | Markey | 119/322 |
| 2,846,976 | * | 8/1958 | Moller | 119/322 |
| 3,003,463 | * | 10/1961 | De Rijcke | 119/322 |

* cited by examiner

Primary Examiner—Thomas Price
(74) Attorney, Agent, or Firm—Mayer, Brown & Platt

(57) ABSTRACT

An egg incubating tray (1) for receiving eggs (3) which are to be incubated, comprises separate rigid supporting means (6) for each egg (3), the supporting means (6) delimiting an opening (2) on the underside and being formed such that an egg (3) which is supported in a stable incubating position by the supporting means (6) is situated partly in the opening (2) and can be turned regularly in the supporting means (6) in accordance with a predetermined schedule, about the longitudinal axis (4) of the egg (3), by means of turning means (10) which act on the said egg part (5) situated in the opening (2), in which the supporting means (6) for each egg (3) comprise two curved supports (6a, 6b) arranged apart from one another, the opening (2) being located between the two curved supports (6a, 6b).

12 Claims, 6 Drawing Sheets

EGG INCUBATING TRAY

The invention relates to an egg incubating tray for receiving eggs which are to be incubated, comprising separate rigid supporting means for each egg, the supporting means delimiting an opening on the underside and being formed such that an egg which is supported in a stable incubating position by the supporting means is situated partly in the opening and can be turned regularly in the supporting means in accordance with a predetermined schedule about the longitudinal axis of the egg, by means of turning means which act on the said egg part situated in the opening.

An egg incubating tray of this kind is disclosed by EP-A-0,670,111. This document discloses an egg incubating tray in which eggs can be supported by an egg holder which essentially exists of a flat plate which is provided with multiple openings matching the shape of an egg. The egg holder plate may be placed in two positions in a special crate. In the first position, the so-called transportation position, the egg holder plate is suspended in the crate so as not to be in contact with the bottom of the crate, as a result of which the eggs rest with their entire weight on the edges of the openings. In the second position, the so-called incubation position, the egg holder plate rests on the bottom of the crate. Due to the fact that the egg holder plate is quite thin, in this position the eggs come to rest with their entire weight on the bottom of the crate and are freely movable between the edges of the openings. The eggs can now be turned about their longitudinal axis during the incubation process by means of a relative movement between the egg holder plate and the bottom of the crate. The bottom of the crate in this case exerts a frictional force on the egg part situated in the opening.

A disadvantage of this known egg incubating tray is that the eggs which are placed therein can easily roll out of the openings in the egg holder plate. This problem arises in particular in the incubation position, in which the eggs are freely movable between the edges of the openings and only have to roll upwards for a distance corresponding to the thickness of the egg holder plate in order to move out of the openings. Furthermore, the distances between adjacent eggs have to be at least large enough for them not to come into contact with one another during the turning movements. For if they were to do so, a frictional force would arise between the eggs themselves, such that there would be no chance of all the eggs being turned about the desired turning angle during the turning operation. For this reason the openings are arranged further apart from one another, which reduces the packing density of this egg incubating tray. Furthermore, the egg incubating tray does not permit a good circulation of heating and cooling air from the top to the bottom of the tray or vice versa, mainly because the egg holder plate is a closed plate, in view of the fact that the egg incubating tray is also used as a hatching tray. Since heating and cooling air is less able to circulate, it is more difficult, inter alia, to control the temperature of the egg during the entire incubating process. In order to overcome this problem, a disproportionately large amount of air has to be displaced, particularly if a large number of incubating trays are placed in one incubating machine. Since the large amount of air flows rather turbulent than constant and laminar, uneven air speeds occur, which makes it even more difficult to control the temperature and the atmospheric humidity. This will result in chicks not being of optimum quality, especially since the incubation process takes place continuously for nearly 3 weeks. In addition, the egg holder is very sensitive to damage if it is positioned in the transportation position in the crate. In particular, the thin egg holder plate does not reinforce the egg incubating tray to any significant degree and will bend considerably under the weight of the eggs.

The object of the present invention is to provide an egg incubating tray in which these disadvantages are eliminated.

This object is achieved according to the invention by the fact that the supporting means for each egg comprise two curved supports arranged apart from one another, in which the opening is present between the two curved supports. Due to the fact that an egg which is positioned in an incubating position in the egg incubation tray is supported by both the curved supports, the egg will lie very stably in the egg incubating tray. Not only is the egg supported in a downward direction, but also the egg is supported sideways by the two curved supports. Advantageously, it remains possible to turn the eggs about the longitudinal axis by allowing a frictional force which is transmitted by turning means to act on the egg part situated in the opening. The egg is held correctly in the stable incubating position by the two curved supports even during the turning operation. The two curved supports and the opening present between them leave sufficient space around the egg for heating and cooling air to be able to circulate freely around the eggs. This makes it possible to achieve good temperature control for the whole egg. Controlling the temperature is particularly important in the second phase of the incubation period, in which the eggs produce so much heat that the eggs have to be cooled to an increasingly large extent (in this second phase of the incubation period, the production of heat gradually increases by a factor of 5). Since less heating or cooling air has to be blown over the eggs in the egg incubating tray according to the invention, partly as a result of the use of a constant laminar air flow, it is possible to achieve a considerable saving in energy. As a result of the considerable improvement in the control of the various parameters, such as the temperature and humidity, the egg incubating tray according to the invention is also distinguished by a high hatching percentage, a high quality of hatched chicks and a virtually simultaneous hatching of the chicks. The egg incubating tray may comprise numerous pairs of curved supports, for example arranged in an array. In particular all the curved supports are connected to one another, and thus form a strong and light framework. The edges of the curved supports are advantageously rounded, so that there are no sharp edges pressing on the egg.

In particular, the lowest supporting point of the first curved support is positioned at a higher level than that of the second curved support, so that the two curved supports position the longitudinal axis of an egg which is supported therein in a stable incubating position at an acute angle to the horizontal. It has been found in practice that the incubation process is improved still further by positioning the longitudinal axis of the eggs at an acute angle to the horizontal.

Expediently, curved supports, positioned behind one another in the longitudinal direction, of separate suppor-ting means are at such a small distance from one another that the top of one egg which is supported in a stable incubating position is positioned under the bottom of another egg which is also supported in a stable incubating position. This brings about a considerable saving of space, since a very high packing density of eggs can thus be achieved. It should be pointed out that this high packing density while retaining good incubation results is only possible because the various parameters associated with a good circulation of air can be controlled very accurately.

By making the first curved support open towards the top, an egg can easily be placed in the supporting means from above by means of a suction box which is known per se. The second curved support is advantageously closed towards the top, so that an egg which it supports is bounded towards the top, and remains situated in its stable incubating position, specifically during the turning movement. This is particularly advantageous if the egg is at an acute angle to the horizontal, because in this case the centre of gravity of the egg is close to the second curved support.

In a particular embodiment, the second curved support is at a slight angle to the vertical. As a result, the second curved support may be open towards the bottom while the egg is thus still supported in the vertical direction towards the bottom. This provides an extra saving on material in the manufacture of the egg incubating tray.

The egg incubating tray can in a known manner comprise upright side walls. Advantageously, at least the side walls in the longitudinal direction are of open work design. A horizontal air flow can thus be guided over and between the eggs with little resistance, in particular in a direction transversely to the longitudinal axis of the eggs.

In one embodiment, a number of the curved supports at their top ends comprise support points for an egg incubating tray which is to be placed on top. Also the curved supports positioned adjacent one another may be connected with one another by means of frame sections, props or the like. Then the support points may be arranged on the top ends of these frame sections. The weight of one or more egg incubating trays which are to be placed on top of the egg incubating tray consequently does not have to be taken solely by the side walls of the egg incubating tray, but can also be taken by the support points.

Advantageously, the turning means are movably connected to the underside of the egg incubating tray. The turning means may in this case be formed by a mainly flat turning plate. In order to increase the frictional force between the turning plate and the egg part situated in the opening, the turning plate is provided with a thickened section extending in the direction of movement for turning. This thickened section may, for example, be provided with a toothing.

The turning plate may furthermore be provided with recesses which are situated at a certain distance from one another in the direction of movement for the turning operation, specifically transversely to the longitudinal axis of the eggs, the certain distance corresponding to the desired turning angle of the egg. By moving the turning plate with respect to the underside of the egg incubating tray over the said certain distance, the egg will move from one recess into another recess and will at the same time be turned. Since the turning plate, and in particular the thickened section provided on it, only comes into contact with the egg part situated in the opening during the turning operation, the egg is only then lifted up slightly in the supporting means, as a result of which the friction between the supporting means and the egg during the turning operation becomes smaller. At the end of the turning operation, the egg falls back into the supporting means and into the recess.

In particular, the turning plate is narrower than the underside of the egg incubating tray and can move between two stops which are fixedly connected to the egg incubating tray. These stops are situated at positions such that the turning plate does not move outside the periphery of the egg incubating tray during the turning movements. Since it must be possible for the turning plate to move backwards and forwards over the said certain distance, which corresponds to the desired turning angle of the egg, the turning plate is narrower by the said certain distance than the underside of the egg incubating tray. As a result, the space which the egg incubating tray takes up is used optimally, as the entire surface of the egg incubating tray can then be filled with eggs. Also, a plurality of egg trays can now be positioned next to one another without having to allow space between them for the reciprocating movement of the turning plate.

As a result of the fact that the turning plate does not move outside the periphery of the egg incubating tray during the turning movement, and to this end is of narrower design, special provisions should preferably be made for the eggs in the region of the longitudinal sides of the egg incubating tray. This is because, as a result of the narrower turning plate, a frictional force is exerted on these eggs for a shorter time during the turning movement, as a consequence of which these eggs are turned over a smaller turning angle than desired. Preferably, therefore, turning cams are provided on the turning plate at its longitudinal edges. These turning cams impart an extra rotation to the eggs supported in the region of the longitudinal edges of the egg incubating tray during the turning movement. This is explained by the fact that the turning cam raises the egg further, so that the egg undergoes extra rotation when it rolls off the cam. This partly compensates for the smaller turning angle.

The two curved supports together with the edges of the opening define, at least locally, a circular shape having dimensions such that an egg which is supported therein in a stable vertical transportation position, in which position the longitudinal axis of the egg is mainly vertical, is situated partly in the opening. The egg incubating tray according to the invention can thus be used both as a tray for transporting eggs and as a tray for incubating eggs. In order for the eggs to be well supported in the vertical transportation position, in particular retaining means which extend between the two curved supports are provided.

Advantageously, the egg incubating tray comprises tilting means on the underside for the purpose of tilting an egg situated in the supporting means from the stable vertical transportation position into the stable incubating position, the tilting means being designed to act, during the tilting operation, on the egg part situated in the opening. Because in the stable transportation position, the longitudinal axis of the egg is preferably mainly vertical, the egg part situated in the opening is either the pointed end either the blunt end of the egg, but preferably the pointed end. During this tilting operation, it is particularly advantageous if the second curved support is open towards the bottom. In this case, the egg does not have to be lifted up slightly first, but its pointed end can tilt freely through this open part of the second curved support.

Surprisingly, it has been found in practice that the tilting means can also be formed by the turning means. An egg which is supported in the vertical transportation position can easily be brought into the stable incubating position by means of one or more movements of the turning means with respect to the underside of the egg incubating tray. The direction of movement of the turning plate can in this case be the same as that which is used for the turning operation.

The invention will be explained in more detail with reference to the enclosed drawing, in which.

Figure 1:
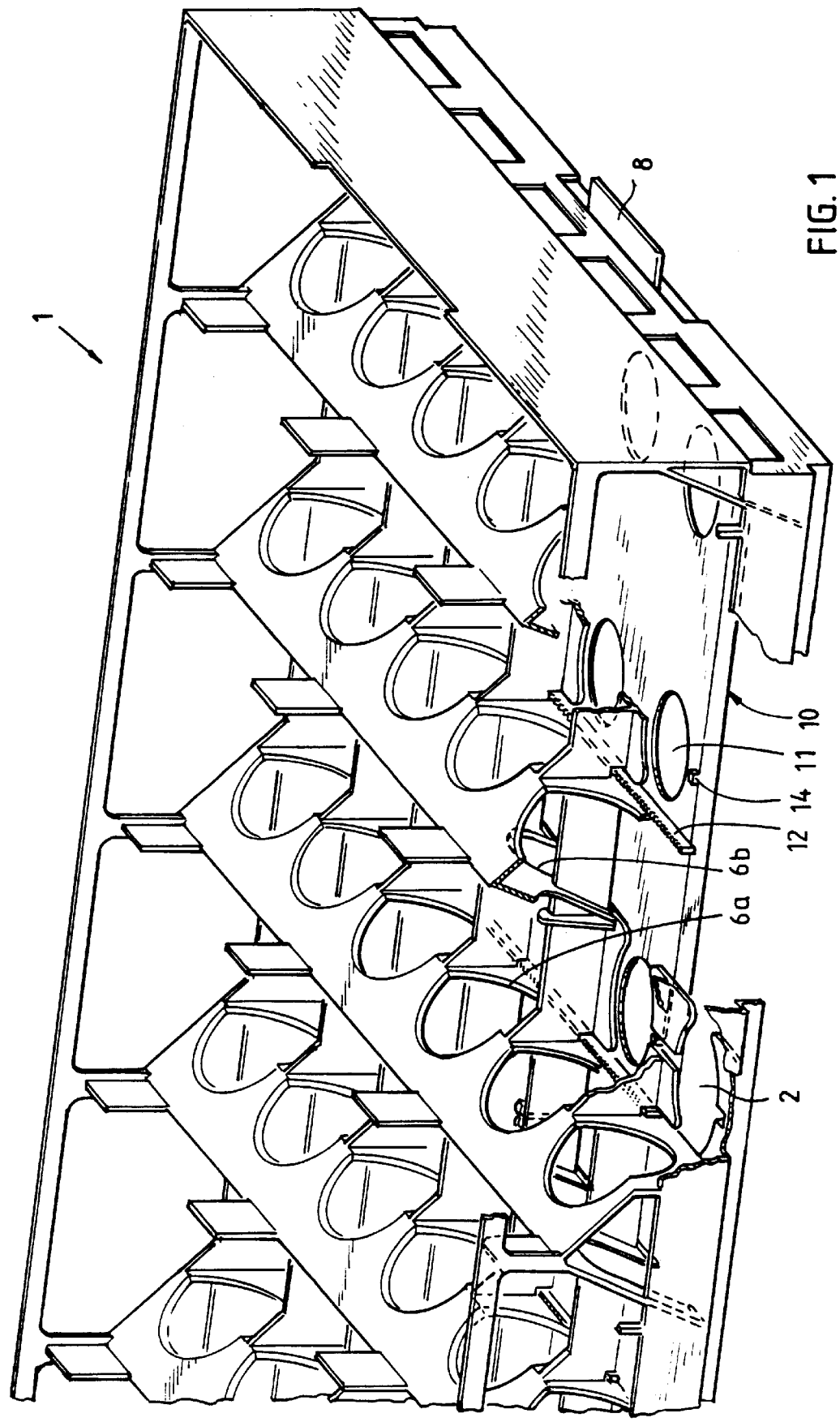
FIG. 1 is a perspective view of part of an egg tray according to the invention.
Figure 2:
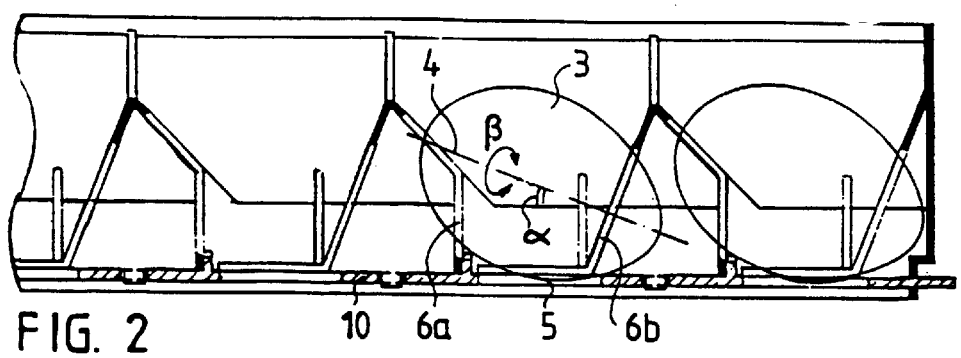
FIG. 2 is a longitudinal sectional view of the egg tray shown in FIG. 1.
Figure 3:
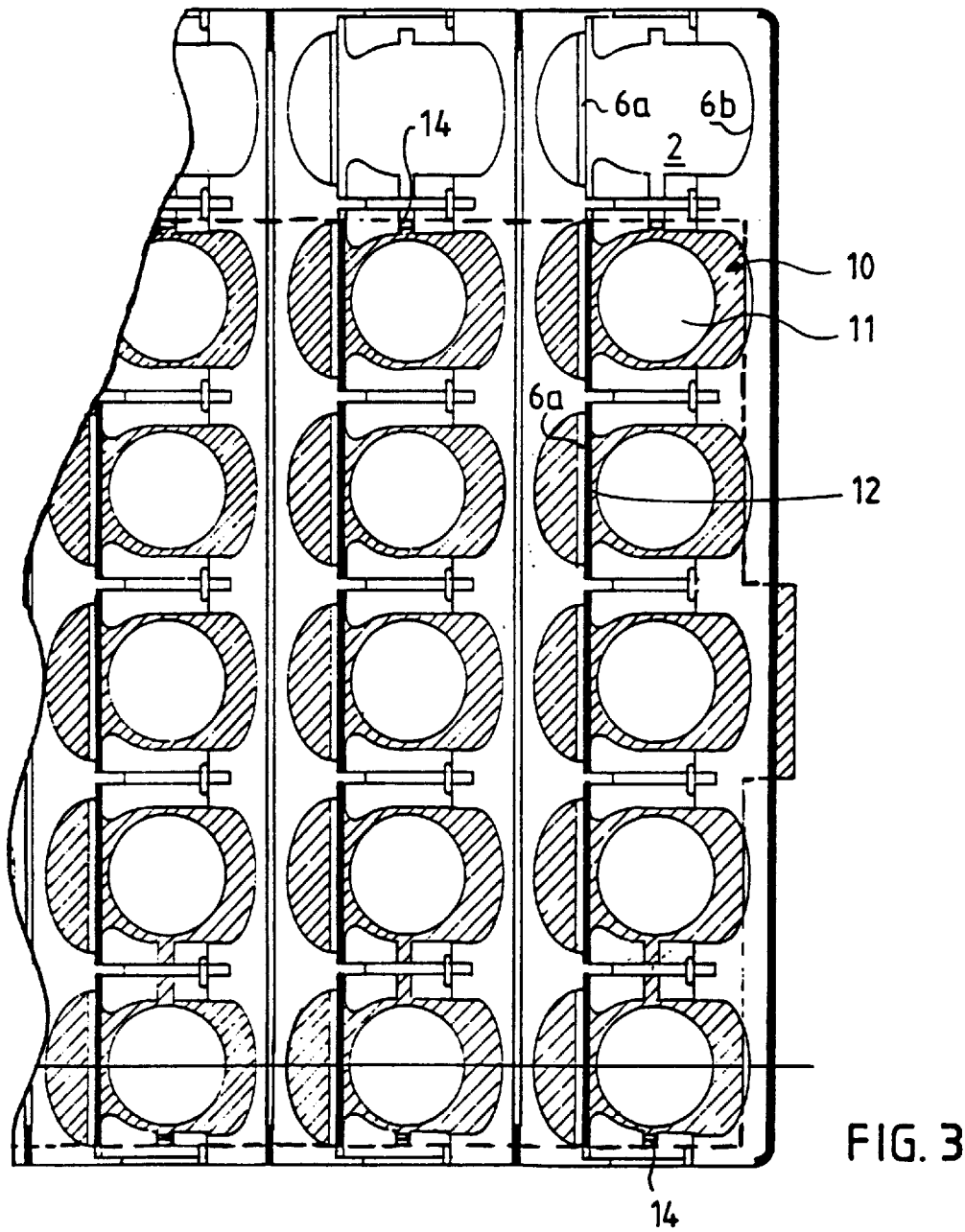
FIG. 3 is a top view of the egg tray shown in FIG. 1.

FIGS. 1–3 show part of an egg tray 1. The egg tray 1 is preferably constructed such that a maximum number of eggs can be placed therein. In FIG. 2 two eggs 3 are schematically drawn. The egg tray 1 is provided with supporting means 6, each of a size which is matched to the dimensions of the eggs which it is desired to incubate. The shape of the supporting means 6 is such that the longitudinal axis 4 of the egg 3 is at an angle α of approximately 20° to the horizontal. The supporting means 6 for each egg are mainly formed by two curved supports 6a, 6b arranged apart from one another. Between each set of curved supports 6a, 6b an opening 2 is located in the bottom of the egg tray 1. The opening 2 allows a part 5 of the egg 3 to project beneath the supporting means in the stable incubating position depicted. The curved supports may have numerous shapes. In essence they are able to stably support an egg in an incubating position, while at the same time having a minimum contact with the egg shell itself. Embodiments of this kind provide a lighter structure and optimize the contact of air with the egg, which permits an even better control of the temperature throughout the incubation process.

Part of a turning plate 10 is shown beneath the egg tray 1. In the top view in FIG. 3 the turning plate 10 is hatched for the sake of clarity, so that the turning plate 10 can easily be distinguished from the rest of the egg tray 1. The turning plate 10 is provided with recesses 11 and a toothened thickening 12, the purpose of which will be explained later on with reference to FIG. 10. By arranging the turning plate 10 close enough to the egg tray 1 the eggs 3 will be raised slightly in the supporting means 6 during a turning operation. The eggs 3 are then to some extent moved clear of their particular curved supports 6a, 6b and, as a result, can be turned more easily. By displacing the turning plate 10 with respect to the egg tray 1, in FIG. 2 in a direction perpendicular to the plane of the drawing, the eggs 3 will roll about their longitudinal axis 4, mainly because of the frictional force exerted on the egg shell by the toothened thickening 12 on the turning plate 10. This displacement may be carried out either manually or using a relatively simple operating mechanism. For this purpose the egg tray 1 comprises a gripping element 8 which projects on the right side and is moveable between two stops which are formed by the edges of a recess in the side wall of the egg tray 1. In order to be able to turn all the eggs in the egg tray 1 simultaneously, the turning plate should be longer, in the displacement direction used for turning, than the egg tray. The minimal extra length required is in this case dependent on the desired turning angle β of the egg. It is also possible to use, for example, a turning element of a limited width, which corresponds to the desired turning angle β of the egg, instead of a turning plate. To turn all the eggs, this turning element would have to be passed beneath the entire egg tray.

In the egg tray 1 shown in FIG. 1 the turning plate 10 at its longitudinal edges is provided with so-called turning cams 14 and is narrower than the egg tray 1. The turning cams 14 raise the eggs supported in the region of the longitudinal edges of the egg tray 1 further upwards during a turning operation. In the reverse turning operation, when the turning plate 10 is moved in the opposite direction these eggs undergo an extra rotation when they roll off the cams. Therefore the turning plate 10 may be of narrower design and does not have to move outside the periphery of the egg tray 1. The turning process preferably takes place once an hour, and specifically such that the turning angle β is between 90 and 120°. Advantageously, the eggs are rolled in an opposite direction every hour. The best incubation result is in this case achieved if the blunt part of the egg faces slightly upwards.

Since the egg tray 1 is partially open at the bottom and since, as a result of the turning operation according to the invention, a different part of the eggshell comes into contact with the supporting means 6 each time, the temperature and humidity around the egg can be controlled better.

The first curved support 6a is open towards the top and closed towards the bottom, while the second curved support 6b is closed towards the top and open towards the bottom. Because the second curved support 6b is at a slight angle to the vertical it is also able to support an egg in a downward direction. The lowest supporting point of the first curved support 6a is positioned at a higher level than that of the second curved support 6b. Therefor the two curved supports 6a, 6b position the longitudinal axis 4 of an egg 3 at an acute angle α to the horizontal. Furthermore the curved supports of separate supporting means 6 are at such a small distance from one another in the longitudinal direction, that the pointed end of one egg 3 is placed under the blunt end of the other egg 3 (see FIG. 2).

The side walls in the longitudinal direction of the egg tray 1 are of open work design. Thus the entire egg tray 1, including the supporting means 6 and the turning means 10, makes it possible that a horizontal air flow can be guided over and between the eggs with little resistance, even when the packing density of eggs 3 is very high.

The curved supports 6a, 6b are mutually connected with one another and thus from a strong and light framework. Particularly the curved supports 6a, 6b adjacent one another are mutually connected by means of frame sections. On top of these frame section support points 13 are provided for supporting another egg tray which is to be placed on top.

Figure 4:
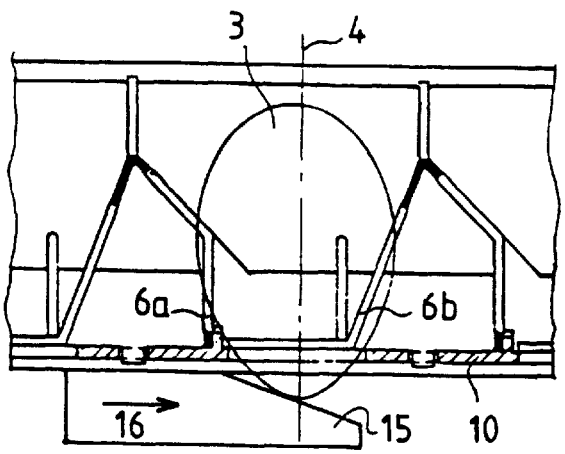
FIGS. 4, 5, 6 show steps in the process of tilting an egg from a vertical transportation position to a mainly lying incubating position in the egg tray according to FIG. 1.
Figure 5:
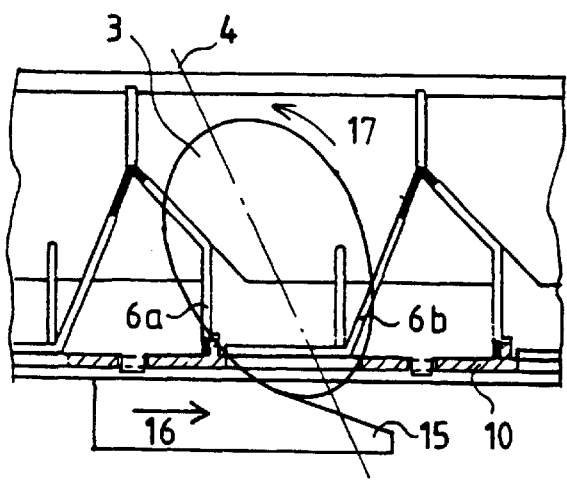
Figure 6:
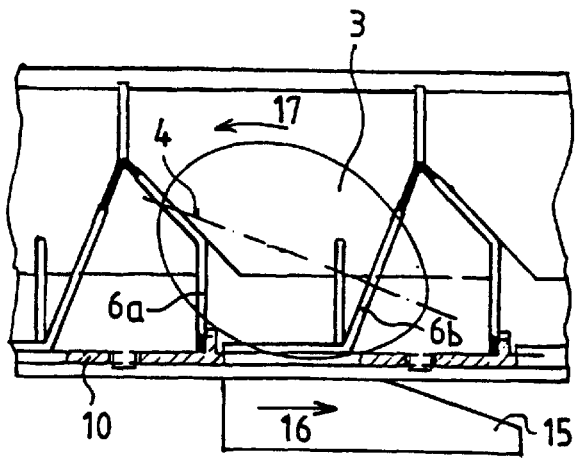

When transporting the eggs 3, it is desirable that they stand upright, in a vertical position. This purpose is served by the abovementioned opening 2. By positioning an egg 3 in the opening 2, preferably with the pointed end downwards, a part of the egg 3 will project beneath the supporting means 6. Before the eggs 3 can be incubated in an incubator following transportation, the eggs 3 will first have to be tilted from the vertical transportation position into the mainly lying incubating position. To this end, FIGS. 4–6 show a method using a tilting element 15. By moving the tilting element 15 with respect to the egg tray 1 in a direction which is indicated in FIGS. 4 and 5 by arrow 16, the eggs 3 will tilt, about the so-called short axis of the egg 3, from the vertical transportation position into the mainly lying, stable incubation position. The tilting direction is indicated by arrow 17. The chamfer depicted on the tilting plate 15 is used to raise the egg 3 slightly at the same time as the tilting operation starts, since otherwise the egg 3 may be broken by being pushed against the edge of the opening 2.

Figure 8:
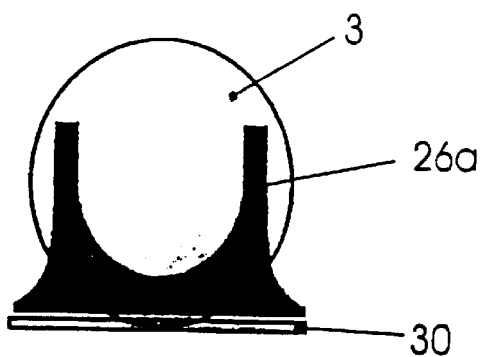
FIGS. 8 and 9 show side views of FIG. 7.
Figure 7:
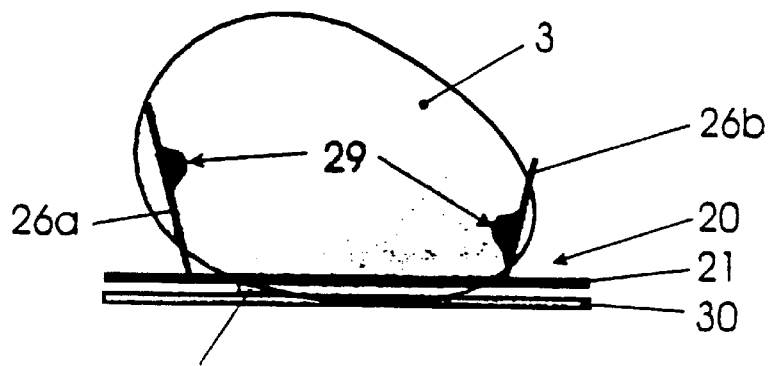
FIG. 7 shows an embodiment of part of an egg tray in which the supporting means are formed by two curved supports.
Figure 9:
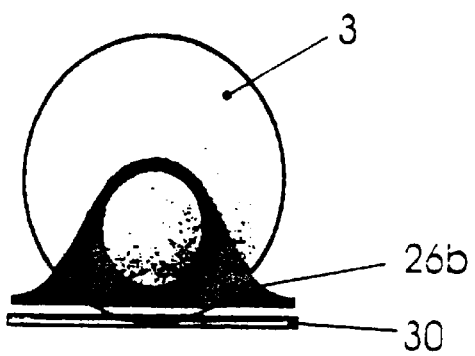

FIGS. 7–9 depict another exemplary embodiment of the supporting means in an egg tray 20. The egg 3 is supported therein by two curved supports 26, which are arranged on a baseplate 21. An opening, through which part of the egg 3 projects, is situated in the baseplate 21 between the supports 26. The support 26a for the blunt end of the egg 3 is in this case open towards the top, while the support 26b for the pointed end of the egg 3 is closed all the way round. As a result, the egg 3 is firmly supported and can easily be arranged in the supports 26. The frictional surface area between the egg 3 and the supporting means 26 is minimal during the turning operation, which means that little effort is required for the turning operation. Moreover, the egg tray 20 is of light overall construction and is thus easy to handle. Two retaining means 29 are arranged on either side of each support 26. These retaining means are used to prevent the egg 3 from falling between the supports 26 in the vertical transportation position.

Figure 10:
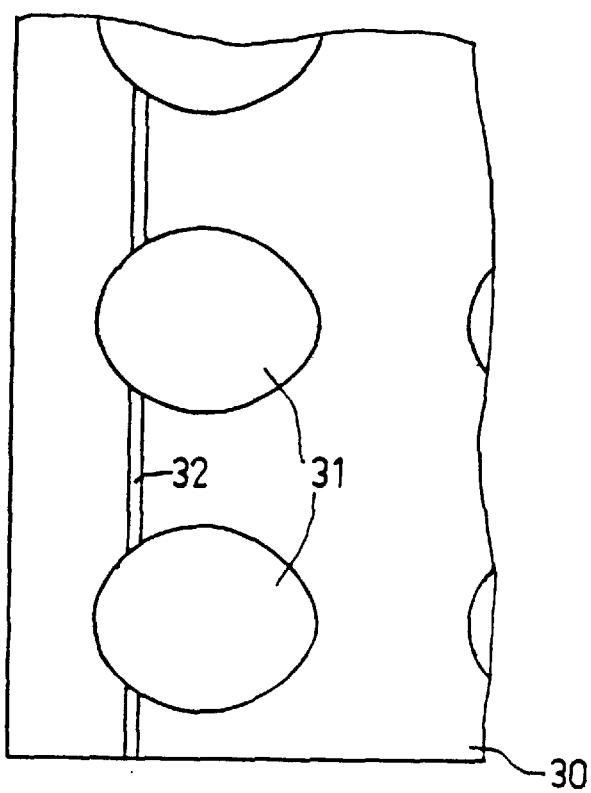
FIG. 10 is a top view of the turning plate shown in FIG. 7–9.

FIG. 10 shows a particular embodiment of a part of the turning plate 30 shown in FIGS. 7–9. The turning plate 30 is provided with recesses 31 positioned at a distance from one another. The distance in this case corresponds to the desired turning angle of the egg. These recesses 31 ensure that the egg comes to rest again on the supporting means after the completion of each turning operation. As a result, the turning means 30 may remain in position beneath an egg tray after a turning operation is completed without disturbing the stable incubation position. Moreover, the egg is still freely accessible to the process air. In addition, an egg may even be placed in the vertical transportation position while the turning means 30 are already in position beneath the egg tray. Preferably, the turning means 30 are moveably connected to the egg tray. A thickened section 32 which is arranged on the turning plate 30 and extends in the direction of displacement for the turning operation can likewise be seen in FIG. 7 and 10. This thickened section 32 is used to raise the egg to a certain degree from its supporting means 26 during a turning operation. The thickened section 32 is preferably situated beneath the centre of gravity of the egg 3 and to the side of the upwardly open support 26a. The importance of this is that the egg 3 is not broken by being pushed against the upwardly closed support 26b during a turning operation, in which the egg 3 is raised slightly.

Figure 11:
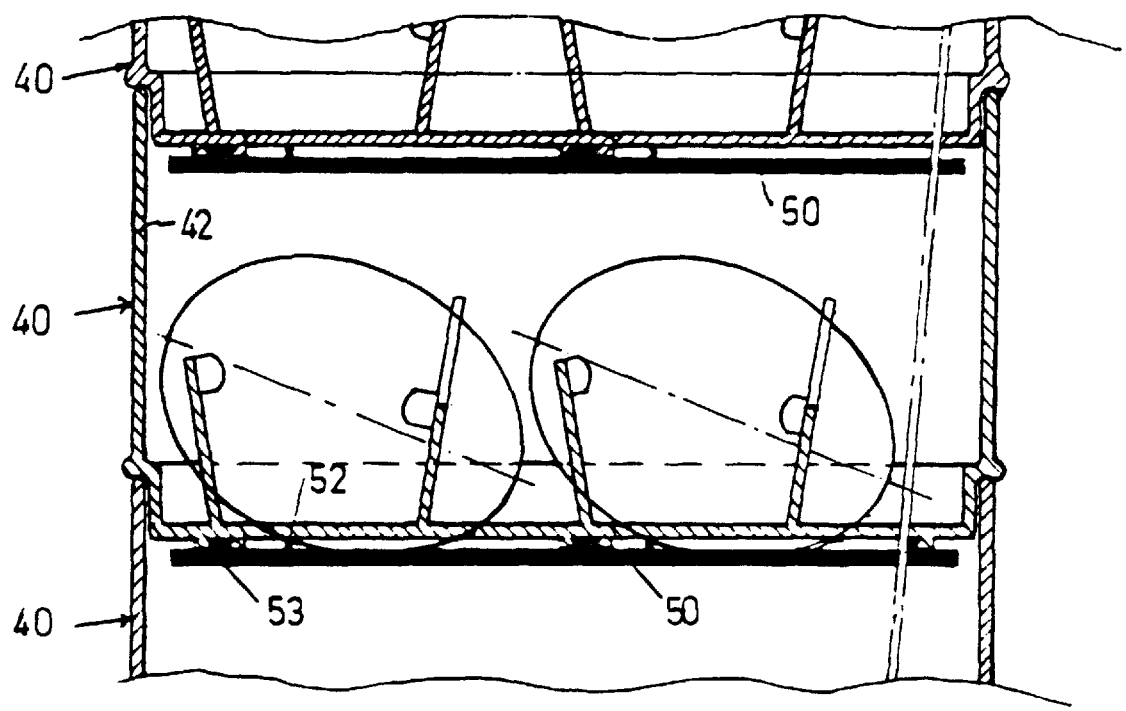
FIG. 11 is a view in cross-section of an egg tray assembly according to the invention.

FIG. 11 shows an egg tray assembly, a plurality of egg trays 40 according to the invention being stacked on top of one another. This assembly may be placed as a unit in an incubator. In this case, egg trays 40 are preferably used comprising turning means 50 which are movably connected thereto on the underside. The distance between the egg trays 40 within the same stack is determined by the height of mutual spacers 42 which form part of the egg trays 40. If a plurality of stacks are placed next to one another, these stacks should, in the embodiment having the broader turning plate, likewise be held at a certain distance from one another, owing to the extra length of the turning plate. To this end, spacers may also be arranged on the side walls of the egg trays 40. These spacers are preferably the same length as the extra length of the turning plate 50. This makes it possible for the turning plates 50 which are situated one behind the other in one plane to push one another along during a turning operation. It can also be seen from FIG. 11 that the turning plate 50 is movably connected to the egg tray 40 by means of dovetail joints 53. As a result, the turning plate 50 can only move in a direction perpendicular to the plane of the drawing with respect to the egg tray 40. In this embodiment too, the turning plate 50 is provided with a thickened section 52 for simultaneously turning and slightly raising the egg during a turning operation.

Figure 12:
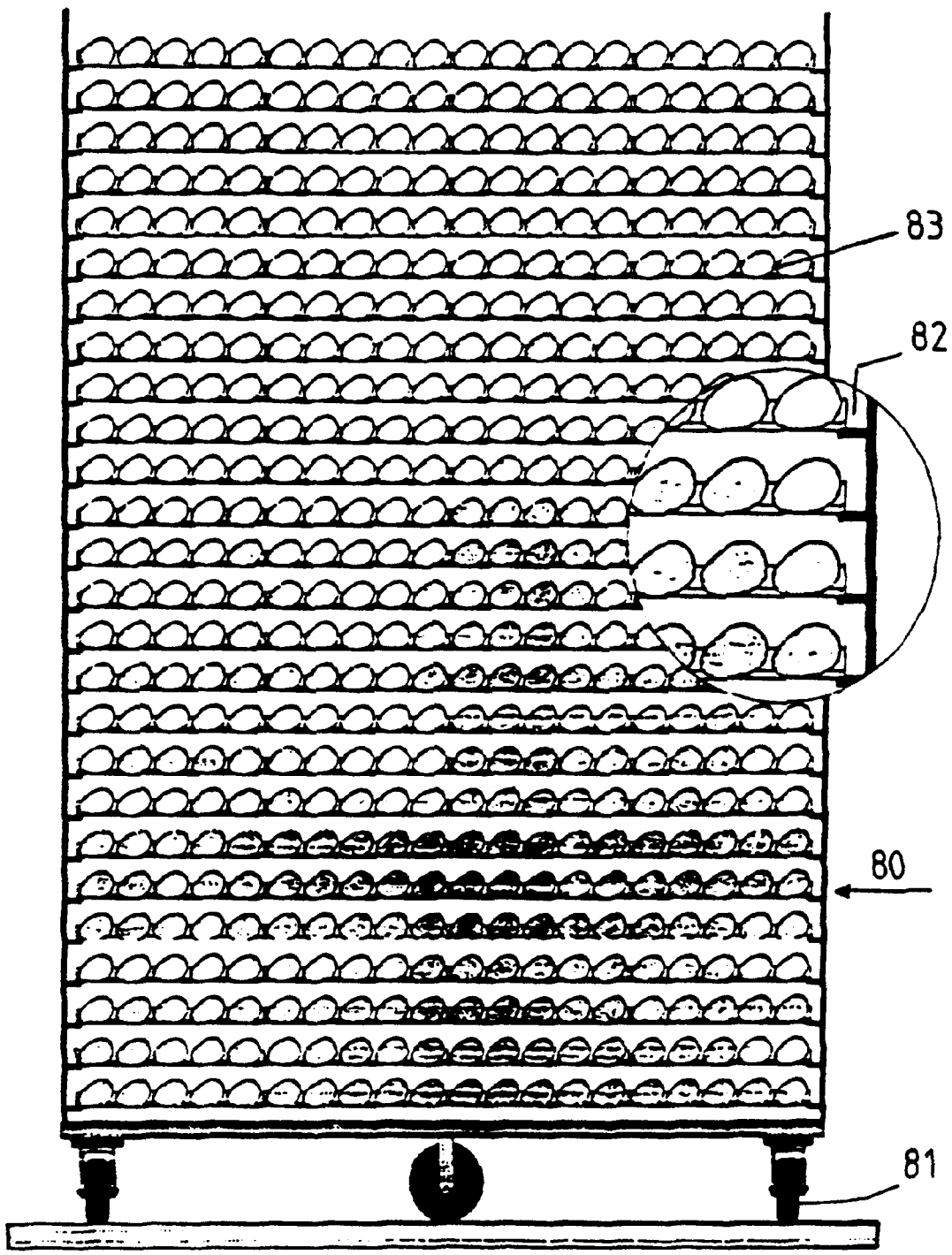
FIG. 12 shows a supporting structure in which egg trays according to the invention are incorporated.

FIG. 12 shows a supporting structure 80 for a plurality of egg trays 83. The egg trays 83 are supported at the side edges of this structure by support means 82. The supporting structure 80 is advantageously provided with wheels 81, so that the whole unit can easily be displaced. By making use of the method for turning the eggs according to the invention, many egg trays 83 may be placed above one another in a space of a particular size. This may even result in a space saving of approximately 33% in floor space with respect to the state of the art. In addition, the mutual distance between eggs in egg trays 83 placed above one another always remains the same. As a result, it is possible to guide heating and/or cooling air uniformly over the eggs at all times. The air flow is preferably laminar.

The supporting structure 80 may be provided with both turning means and tilting means. The tilting means may, for example, be formed by a rail (not shown) arranged on the side where each egg tray 83 is introduced, which rail is provided with a suitable chamfer. When an egg tray 83 is placed in the supporting structure 80, the eggs are automatically tilted from the vertical transportation position into the stable incubation position by firstly sliding the egg tray 83 over the rail. In another embodiment (not shown) of the supporting structure, each egg tray is supported by a plate. This plate may then also form the turning means. Since the plate is part of the supporting structure 80, this means that the egg tray 83 has to be displaced with respect to the supporting plate for the turning operation. Naturally, it is also possible to use egg trays 83 in the supporting structure 80 which comprise turning means which are movably connected to the trays on the underside, as has already been described above with reference to FIG. 11. An egg tray 83 may also be removed from the supporting structure 80 for a turning operation, in order then to turn the eggs 3 with the aid of external turning means, such as a table-top, following which the egg tray 83 is placed back in the supporting structure 80. The supporting structure 80 may advantageously be used both for transportation purposes and in an incubator.

In the embodiments depicted, the longitudinal axis of the eggs are in each case at a slight angle to the horizontal, which gives an optimum incubation result. However, the invention likewise relates to an egg tray in which the eggs lie horizontally, for the advantageous curved supports and method of turning according to the invention may also be employed in this case. In addition, in the embodiments shown, part of the egg always extends beneath the supporting means. This is advantageous since a mainly flat turning means can then be used. However, the invention also relates to an egg tray in which although part of the egg does lie in the opening, it does not project below it. The turning means should then project into each opening from the bottom. In this case, a rotatable turning wheel provided with a profile may, for example, be envisaged.

The invention thus enables a saving to be made in the floor area required, in the amount of process air required for cooling and/or heating, and in the energy required for a turning operation. Moreover, an improvement in the entire incubating process is realized, as a result of which a higher hatching percentage of the chicks to be incubated is achieved. The simplicity of the egg tray with turning means allows optimum hygiene to be achieved in an incubator.

I claim:

1. An egg incubating tray for receiving eggs which are to be incubated, the tray comprising:
   a bottom surface having openings;
   a perimetric frame;
   a series of separate rigid support structures supporting each egg in a stable incubating position, the supporting structure including a first curved support and a second curved support extending substantially upward from said bottom surface, said first and second support being arranged apart such that said first curved support is placed behind said second curved support;

wherein said openings in said bottom surface are situated between said first and said second curved supports of a corresponding support structure; and a turning means positioned underneath said openings in said bottom surface, said turning means being movable in a horizontal direction with respect to said support structure thereby turning an egg within its supporting structure.

2. An egg incubating tray according to claim 1 further comprising an underside and wherein said turning means are movably connected to said underside.

3. An egg incubating tray according to claim 2, wherein said turning means is a primarily flat turning plate, wherein said turning plate has a thickened section extending in the direction of movement for turning, said section being located at said openings in said bottom plate.

4. An egg incubating tray according to claim 3 further comprising:

two stops which are fixed connected to the egg incubating tray, the stops limiting movement of said turning plate in the direction of movement for turning thereby limiting said turning plate to the periphery of the egg incubating tray during a movement for turning; and wherein said turning plate is narrower by essentially a certain distance in the direction of movement for turning, which certain distance corresponds to a desired turning angle of an egg.

5. An egg incubating tray according to claim 4, wherein said turning plate includes side edges perpendicular to the direction of movement for turning, said turning plate further including turning cams at said side edges for imparting an extra rotation to eggs supported in said support structures lying in a region of corresponding side edges of the egg incubating tray during a movement for turning.

6. An egg incubating tray according to claim 2, wherein said turning means is a primarily flat turning plate provided with recesses which lie at a certain distance from one another in the direction of movement for turning, said certain distance corresponding to a desired turning angle of an egg.

7. An egg incubating tray according to claim 1, wherein said first and second curved supports together with the edges of said opening, define a circular shape having dimensions which are such that an egg which is supported therein, in a stable vertical transportation position, in which a longitudinal axis of the egg is mainly vertical, is situated partly with an egg end part in said opening, the egg incubating tray further comprising tilting means positioned underneath at least said openings in said bottom surface, said tiling means being movable in a horizontal direction with respect to said supporting means for tilting an egg from the stable vertical transportation position into the stable incubating position on the egg part situated in said opening.

8. An egg incubating tray according to claim 7, wherein the turning means also forms said tilting means.

9. An egg incubating tray according to claim 1, wherein said first and second curved supports have top ends which are support points for a second egg incubating tray.

10. An egg incubating tray according to claim 1, wherein said first curved support has an open top end.

11. An egg incubating tray according to claim 1, wherein said second curved support extends inclined at a slight angle to the vertical.

12. An egg incubating tray according to claim 11, wherein said second curved support has an open bottom end.

* * * * *